(12) United States Patent
Araki et al.

(10) Patent No.: US 7,868,744 B2
(45) Date of Patent: Jan. 11, 2011

(54) DRIVING APPARATUS OF MOVER

(75) Inventors: Kyoichiro Araki, Kyoto (JP); Isao Yamamoto, Kyoto (JP)

(73) Assignee: Rohm Co., Ltd. (JP)

( * ) Notice: Subject to any disclaimer, the term of this patent is extended or adjusted under 35 U.S.C. 154(b) by 386 days.

(21) Appl. No.: 12/138,609

(22) Filed: Jun. 13, 2008

(65) Prior Publication Data
US 2008/0309467 A1    Dec. 18, 2008

(30) Foreign Application Priority Data
Jun. 14, 2007    (JP) ............................. 2007-157633

(51) Int. Cl.
*H04B 3/36* (2006.01)
*G08B 21/00* (2006.01)
(52) U.S. Cl. ..................... 340/407.1; 340/653; 323/283
(58) Field of Classification Search ................. 340/635, 340/644, 653, 657, 659, 660, 407.1; 318/11, 318/14; 323/271, 272, 283; 363/65, 79
See application file for complete search history.

(56) References Cited

U.S. PATENT DOCUMENTS

| | | | | |
|---|---|---|---|---|
| 4,695,776 A | * | 9/1987 | Dishner et al. | ................. 318/14 |
| 6,894,910 B1 | * | 5/2005 | Wu | .............................. 363/79 |
| 7,071,666 B2 | * | 7/2006 | Imai et al. | .................... 323/283 |
| 7,078,884 B2 | * | 7/2006 | Miura et al. | ................. 323/272 |

FOREIGN PATENT DOCUMENTS

| JP | 2001-350592 | | 12/2001 |
|---|---|---|---|
| JP | 02004159218 A | * | 6/2004 |

* cited by examiner

*Primary Examiner*—Van T. Trieu
(74) *Attorney, Agent, or Firm*—Cantor Colburn LLP

(57) ABSTRACT

A driving apparatus drives a mover arranged for feedback of a touch panel. A reference voltage generation unit generates a reference voltage having a signal waveform to be applied to the mover. A pulse modulator generates a PWM signal of which duty ratio is controlled by feedback so that a feedback voltage corresponding to a drive voltage to be applied to the mover approaches the reference voltage. A switching element of the DC/DC converter is turned ON/OFF by a PWM signal from the pulse modulator, so that an output voltage of the DC/DC converter is controlled, and a drive voltage corresponding to the output voltage is applied to the mover.

4 Claims, 4 Drawing Sheets

DRIVING APPARATUS OF MOVER

BACKGROUND OF THE INVENTION

1. Field of the Invention

The present invention relates to a driving technique of a mover arranged for force feedback of a touch panel.

2. Description of the Related Art

In thin display apparatuses such as a liquid crystal display, a touch panel with which input operation can be performed when the user presses the surface thereof is being widely used. A force feedback technique for vibrating the surface of the touch panel in response to the pressing is used to sense the pressing of the touch panel by the user.

A mover for vibrating the surface of the touch panel is arranged to perform force feedback. When voltage is applied to the mover in response to the pressing by the user, the mover vibrates, and a pressing feeling corresponding to the input operation is provided to the user. Japanese Patent Application (Laid-Open) No. 2001-350592 discloses a touch panel equipped with such force feedback mechanism (pressing feeling generator).

The pressing feeling generator disclosed in Japanese Patent Application (Laid-Open) No. 2001-350592 generates the voltage to be applied to the mover using a commercial alternating electric current (AC) voltage. Therefore, the generator cannot be used in portable equipments that are not supplied with commercial AC voltage.

SUMMARY OF THE INVENTION

The present invention has been made in view of the above problems, and invention general purpose thereof is to provide a technique of easily driving a mover for force feedback of a touch panel.

One embodiment of the present invention relates to a control circuit of a driving apparatus which drives a mover arranged for force feedback of a touch panel. The control circuit includes a reference voltage generation unit which generates a reference voltage having a signal waveform (time waveform) to be applied to the mover, and a pulse modulator which generates a pulse signal of which duty ratio is controlled by feedback so that a feedback voltage corresponding to a drive voltage to be applied to the mover approaches the reference voltage. A switching element of a DC/DC converter is turned ON/OFF by the pulse signal from the pulse modulator, so that an output voltage of the DC/DC voltage is controlled, and a drive voltage corresponding to the output voltage is applied to the mover.

According to such embodiment, the drive voltage of the mover can be generated without using a commercial AC voltage. Since high voltage is not generated inside the control circuit, low-voltage element can be used compared to the case of using the commercial AC voltage, the circuit can be miniaturized, and the cost can be reduced.

The reference voltage generation unit may include a table which holds a predetermined periodic waveform; and a digital-analog converter which reads out the waveform from the table when receiving a detection signal output from the touch panel in response to the pressing, and digital-analog converts the signal waveform; wherein an output of the digital-analog converter may be output as the reference voltage.

In this case, various arbitrary drive voltages can be supplied to the mover according to the signal waveform of the table.

Another embodiment of the present invention relates to a driving apparatus of a mover. The driving apparatus includes two control circuits described above; and two DC/DC converters controlled by a pulse signal from the two control circuits. In the respective control circuit, a reference voltage having reverse phase with respect to each other is generated, an output voltage of the respective DC/DC converter is controlled to have a reverse phase with respect to each other, and the output voltages of the two DC/DC converters are applied to both ends of the mover.

Still another embodiment of the present invention is a touch panel apparatus. The touch panel apparatus includes a touch panel; a mover arranged in the touch panel; the control circuit described above; and a DC/DC converter controlled by a pulse signal output from the control circuit; wherein an output voltage of the DC/DC converter is applied to the mover.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

The invention will now be described based on preferred embodiments which do not intend to limit the scope of the present invention but exemplify the invention. All of the features and the combinations thereof described in the embodiment are not necessarily essential to the invention.

Figure 1:
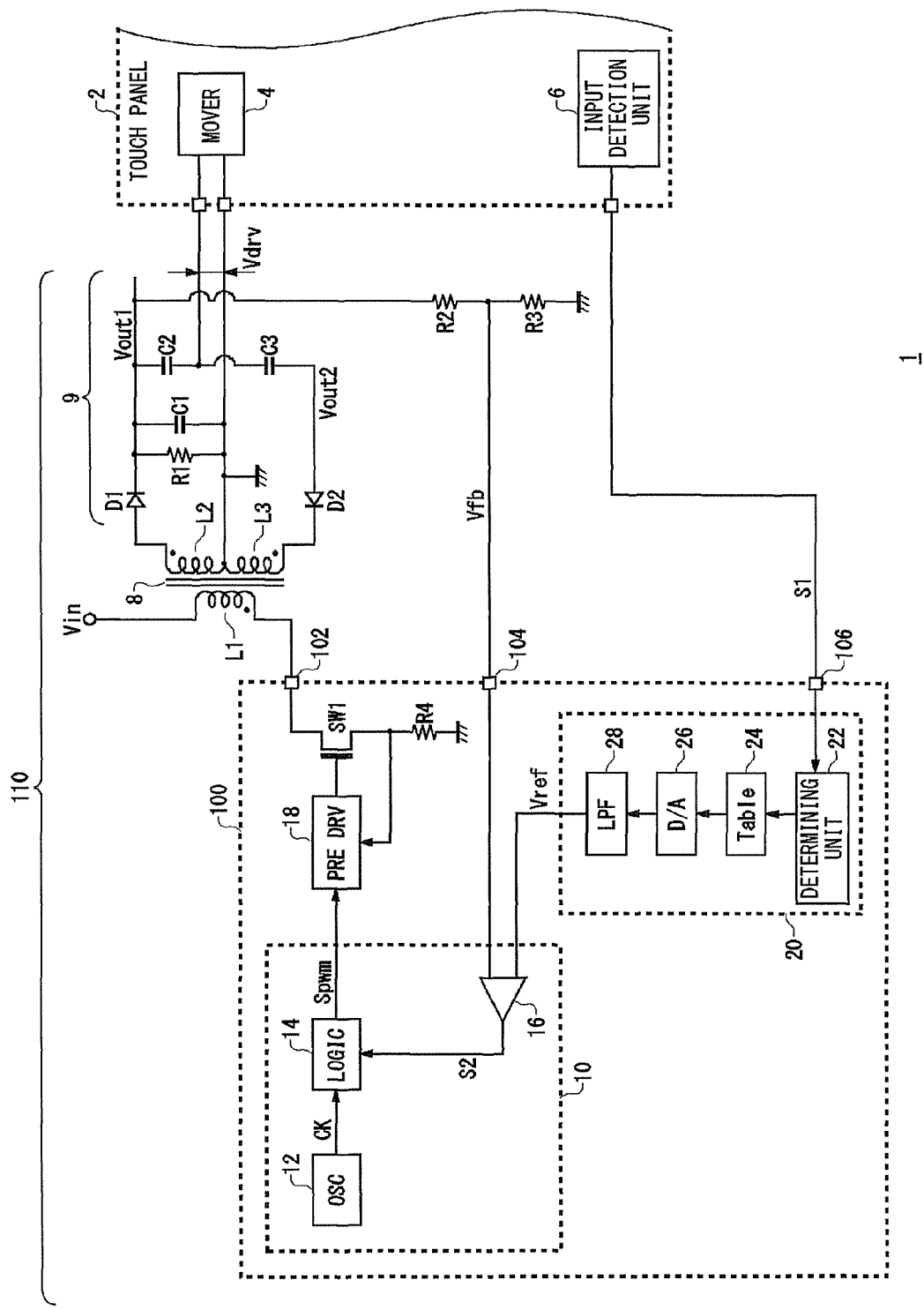
FIG. 1 is a circuit diagram showing a configuration of a touch panel apparatus equipped with a driving apparatus of a mover according to an embodiment.

FIG. 1 is a circuit diagram showing a configuration of a touch panel apparatus 1 equipped with a driving apparatus 110 of a mover according to an embodiment. The touch panel apparatus 1 includes a touch panel 2 and the driving apparatus 110.

The touch panel 2 includes a mover 4 and an input detection unit 6. The input detection unit 6 determines whether or not the user of the touch panel 2 has input to the panel, that is, whether or not the panel is pressed, and outputs the determination result as a detection signal S1. The driving apparatus 110 receives the detection signal S1, and outputs a drive voltage Vdrv to the mover 4 when the user presses the touch panel. The mover 4 vibrates the touch panel 2 when applied with the drive voltage Vdrv, and gives the pressing feeling to the user.

The driving apparatus 110 includes a control circuit 100, a transformer 8, a rectifying and smoothing circuit 9, and feedback resistors R2, R3. The driving apparatus 110 receives a battery voltage or an input voltage Vin of direct current (DC)

from a power supply circuit, converts the input voltage Vin to the drive voltage Vdrv, and outputs the drive voltage Vdrv.

The transformer 8 and the rectifying and smoothing circuit 9 configure a so-called DC/DC converter. The transformer 8 includes a primary coil L1, and secondary coils L2, L3. One end of the primary coil L1 of the transformer 8 is applied with the input voltage Vin, and the other end is connected to a switching terminal 102 of the control circuit 100. When a switching voltage Vsw is applied to the switching terminal 102, current generates in the secondary coil L2 and the secondary coil L3 arranged on the secondary side of the transformer 8.

The rectifying and smoothing circuit 9 includes diodes D1, D2, capacitors C1, C2, C3, and an output resistor R1. The diode D1 and the capacitor C1 rectify and smooth the current (or induced voltage) flowing to the secondary coil L2, and outputs an output voltage Vout1. Similarly, the diode D2 and the capacitors C2, C3 rectify and smooth the current (or induced voltage) flowing to the secondary coil L3, and outputs an output voltage Vout2. The drive voltage Vdrv obtained by voltage-dividing the output voltages Vout1, Vout2 with the capacitors C2, C3 is supplied to the mover 4. Since the diodes D1, D2 are arranged with the anode and the cathode reversely directed, the output voltage Vout1 becomes a voltage biased in the positive direction, and the output voltage Vout2 becomes a voltage biased in the negative direction.

The control circuit 100 includes the switching terminal 102 for outputting the switching voltage Vsw, a feedback terminal 104 to be input with a feedback voltage Vfb corresponding to the output voltage Vout1, and a detection terminal 106 to be input with the detection signal S1, where the output voltage Vout1 is feedback-controlled based on the feedback voltage Vfb.

The control circuit 100 includes a reference voltage generation unit 20, a pulse modulator 10, a pre-driver 18, a switching element SW1, and a detection resistor R4.

The switching element SW1 and the detection resistor R4 are arranged in series between the switching terminal 102 and a ground terminal, that is, on a current path of the primary coil L1. The detection resistor R4 converts the current I1 flowing to the primary coil L1 to voltage, and outputs the same to the pre-driver 18.

The reference voltage generation unit 20 generates the reference voltage Vref having a signal waveform to be applied to the mover 4. The reference voltage Vref is, for example, a sinusoidal wave. In the present embodiment, the reference voltage generation unit 20 includes a determining unit 22, a table 24, a D/A converter 26, and a low pass filter 28.

The table 24 is configured by a ROM (Read Only Memory) or a RAM (Random Access Memory), a register, and other storage means, and holds a predetermined signal waveform. A few patterns may be prepared for the signal waveform, each pattern desirably being rewritable.

The determining unit 22 receives the detection signal S1 output from the touch panel 2 in response to the pressing, and determines the presence of pressing. When pressing is detected by the determining unit 22, the D/A converter 26 reads out a periodic waveform from the table 24 and digital/analog converts the same. The low pass filter 28 filters the voltage output from the D/A converter 26 and outputs the same as the reference voltage Vref.

The output voltage Vout1 output from the rectifying and smoothing circuit 9 is voltage-divided by the feedback resistor R2 and the feedback resistor R3, and input to the feedback terminal 104 of the control circuit 100 as the feedback voltage Vfb. The pulse modulator 10 receives the feedback voltage Vfb corresponding to the drive voltage Vdrv to be applied to the mover 4 and the reference voltage Vref. The pulse modulator 10 generates a pulse width modulation signal Spwm (hereinafter referred to as PWM signal) of which duty ratio is controlled by feedback so that the feedback voltage Vfb approaches the reference voltage Vref. The pulse modulator 10 may be a known pulse width modulator, a pulse frequency modulator, or the like.

For example, in the circuit of FIG. 1, the pulse modulator 10 includes an oscillator 12, a logic unit 14, and a comparator 16. The oscillator 12 generates a clock signal CK. The comparator 16 compares the feedback voltage Vfb and the reference voltage Vref, and outputs a signal corresponding to the magnitude relation. The logic unit 14 has the timing of the positive edge or the negative edge controlled according to the clock signal CK and the output signal S2 of the comparator 16.

The pre-driver 18 controls the timing to turn ON the switching element SW1 based on the PWM signal Spwm. The pre-driver 18 compares a voltage drop across the detection resistor R4 with a threshold voltage, and turns OFF the switching element SW1 when the voltage drop reaches the threshold voltage, that is, when the current of the primary coil L1 reaches a predetermined peak current.

As a result, the output voltage Vout1 of the DC/DC converter is feedback-controlled so as to match the reference voltage Vref, and the desired voltage is applied to the mover 4. The pulse modulation scheme is not limited to that of the embodiment, and an error amplifier may be used in place of the comparator, so that the output voltage of the error amplifier may be sliced with a triangular wave or a saw-tooth wave to generate the PWM signal Spwm. The scheme is arbitrary.

Figure 2:
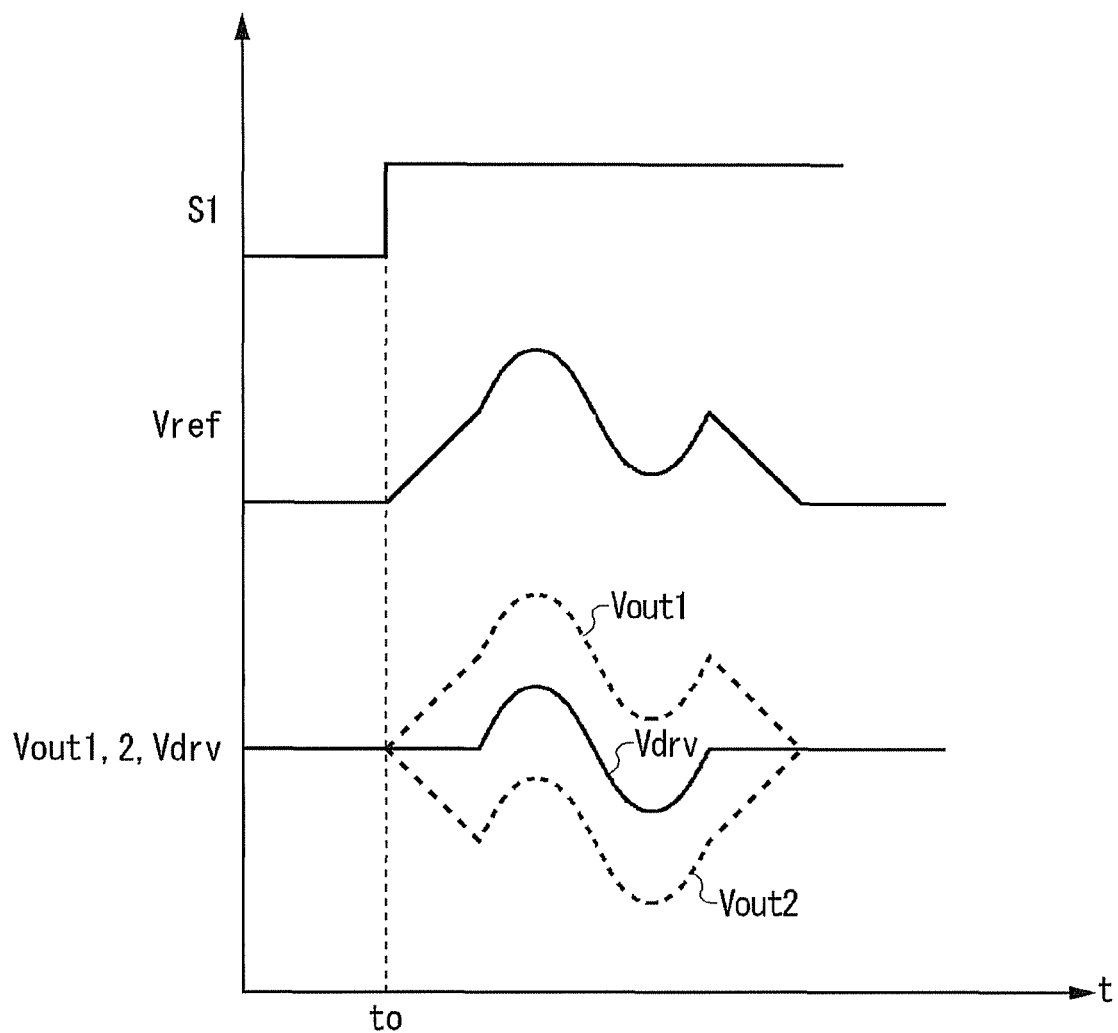
FIG. 2 is an operation waveform chart of the driving apparatus of FIG. 1.

The operation of the driving apparatus 110 configured as above will be described. FIG. 2 is an operation waveform chart of the driving apparatus 110 of FIG. 1.

At time t0, when the user presses the touch panel 2, the detection signal S1 becomes high level. In response thereto, the reference voltage generation unit 20 reads out waveform data from the table 24 and D/A-converts the read out data to generate the reference voltage Vref.

The reference voltage Vref is shown as a waveform that first rises, and thereafter sinusoidal vibrates for one cycle, and then lowers. The present invention is not limited to the waveform of the reference voltage Vref, and an arbitrary waveform can be used. When the waveform of FIG. 2 is used, an appropriate pressing feeling can be fed back without giving a shock to the user.

The control circuit 100 changes the output voltage Vout1 so as to follow the reference voltage Vref by feedback control. At the same time, the output voltage Vout2 fluctuates following the reference voltage Vref while being biased in the negative direction. As a result, the drive voltage Vdrv is generated as an intermediate voltage of the output voltages Vout1, Vout2. The drive voltage Vdrv becomes a sinusoidal wave having the ground voltage 0V as the center.

According to the control circuit 100 of the present embodiment, the drive voltage Vdrv of the mover 4 can be generated without using the commercial AC voltage. Therefore, the present invention can be suitably used in battery driven portable telephone terminal, PDA (Personal Digital Assistant), laptop and the like.

The voltage of each node becomes lower than or equal to the input voltage Vin on the primary side of the transformer 8. Therefore, an inexpensive low-voltage element can be used and low cost can be realized since high-voltage element does not need to be used.

Furthermore, the waveform of the drive voltage Vdrv can be arbitrarily set by holding the signal waveform in the table

24 as in the embodiment. When using the commercial AC voltage as in the conventional art, the vibration frequency of the mover is fixed and the waveform is limited to a sinusoidal wave, but such disadvantages do not arise in the present embodiment, which becomes a large merit. For instance, if a signal containing high frequency component is stored as the signal waveform, the mover 4 can be driven with an acute drive voltage thereby giving a shock to fingers of the user when the user performs a prohibited operation.

A plurality of waveform data may be stored in the table 24. In this case, different pressing feeling corresponding to the input operation can be provided to the user by reading out different waveform data according to the type of input operation of the user on the touch panel.

Figure 3:
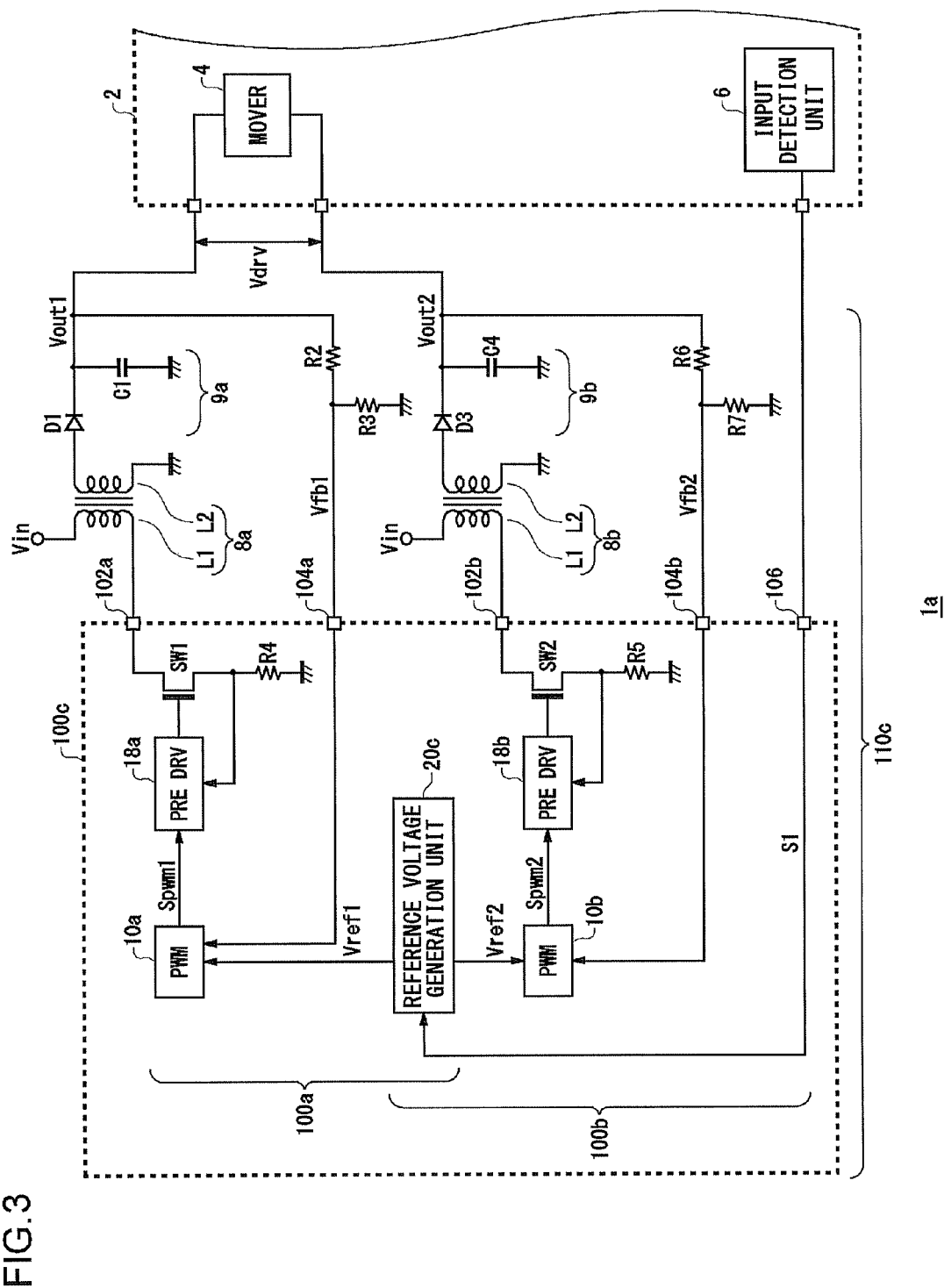
FIG. 3 is a circuit diagram showing a configuration of a driving apparatus according to a variant.

FIG. 3 is a circuit diagram showing a configuration of a driving apparatus 110c according to a variant. The control circuit 100 of FIG. 1 is incorporated for two channels in the control circuit 100c of FIG. 3. A control circuit 100a of the first channel includes a pulse modulator 10a, a pre-driver 18b, and a reference voltage generation unit 20c; and a control circuit 100b of the second channel includes a pulse modulator 10a, a pre-driver 18a, and the reference voltage generation unit 20c. The two control circuits are configured similar to the control circuit 100 of FIG. 1. The reference voltage generation unit 20c may be partially or entirely shared by the two channels, or may be separately arranged.

Two DC/DC converters are arranged for the control circuits of the first and second channels, respectively. The DC/DC converter of the first channel includes a first transformer 8a and a first rectifying and smoothing circuit 9a, and the DC/DC converter of the second channel includes a second transformer 8b and a second rectifying and smoothing circuit 9b. The output voltages Vout1, Vout2 of the respective DC/DC converters of the first and second channels are applied to both ends of the mover 4, and the differential voltage of the two output voltages Vout1, Vout2 becomes the drive voltage Vdrv.

The control circuit 100a of the first channel feedback-controls the output voltage Vout1 so that the feedback voltage Vfb1 corresponding to the respective output voltage Vout1 matches the reference voltage Vref1. The control circuit 100b of the second channel feedback-controls the output voltage Vout2 so that the reference voltage Vref2 matches the feedback voltage Vfb2. The reference voltage generation unit 20c generates the reference voltages Vref1, Vref2 so as to respectively have reverse phases with the same bias level as the center.

Figure 4:
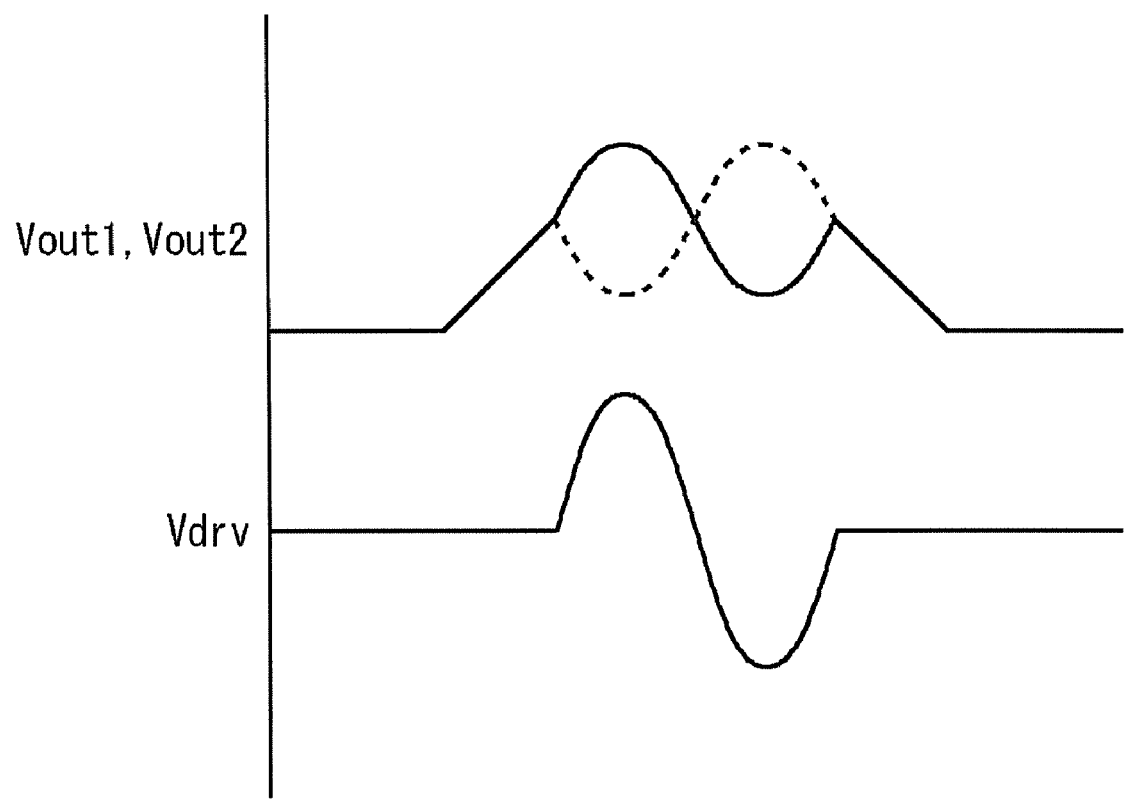
FIG. 4 is an operation waveform chart of the driving apparatus of FIG. 3.

FIG. 4 is an operation waveform chart of the driving apparatus 110c of FIG. 3. According to the driving apparatus 110c of FIG. 3, the output voltages Vout1, Vout2 that change at reverse phase with the common bias level as the center as shown in the figure are generated, and such output voltages are applied to both ends of the mover 4 to apply the drive voltage Vdrv having the ground voltage as the center.

The embodiment is illustrative, and various modifications can be made on the combination of each component and each processing process, where it should be recognized by those skilled in the art that those modifications are encompassed within the scope of the present invention. The modifications are as described below.

In the embodiment, a case where the DC/DC converter using the transformer and the rectifying and smoothing circuit is used has been described, but the coil of the transformer or the arrangement of the diode and the capacitor is arbitrary, and various topologies can be used. In place of an insulating DC/DC converter, a non-insulating switching regulator may be used.

In the embodiment, a case where the reference voltage generation unit 20 is configured using the table (memory) and the D/A converter has been described, but the present invention is not limited thereto. For instance, the reference voltage Vref may be generated by generating a periodic voltage such as rectangular wave voltage, triangular wave voltage, sawtooth wave voltage, and the like, and filtering the same.

Furthermore, in the embodiment, the setting of the logic values of high level and low level is merely an example, and can be freely changed by being appropriately inverted with an inverter and the like.

While the preferred embodiments of the present invention have been described using specific terms, such description is for illustrative purposes only, and it is to be understood that changes and variations may be made without departing from the spirit or scope of the appended claims.

What is claimed is:

1. A control circuit of a driving apparatus which drives a mover arranged for force feedback of a touch panel, the control circuit comprising:
    a reference voltage generation unit which generates a reference voltage having a signal waveform to be applied to the mover; and
    a pulse modulator which generates a pulse signal of which duty ratio is controlled by feedback so that a feedback voltage corresponding to a drive voltage to be applied to the mover approaches the reference voltage; wherein
    a switching element of a DC/DC converter is turned ON/OFF by the pulse signal from the pulse modulator, so that an output voltage of the DC/DC voltage is controlled, and the drive voltage corresponding to the output voltage is applied to the mover.

2. The control circuit according to claim 1, wherein
    the reference voltage generation unit includes,
    a table which holds a predetermined signal waveform; and
    a digital-analog converter which reads out the signal waveform from the table when receiving a detection signal output from the touch panel in response to the pressing, and digital-analog converts the signal waveform; and
    an output of the digital-analog converter is output as the reference voltage.

3. A driving apparatus comprising:
    two control circuits according to claim 1; and
    two DC/DC converters controlled by a pulse signal from the two control circuits; wherein
    in the respective control circuit, a reference voltage having reverse phase with respect to each other is generated, an output voltage of the respective DC/DC converter is controlled to have a reverse phase with respect to each other, and the output voltages of the two DC/DC converters are applied to both ends of the mover.

4. A touch panel apparatus comprising:
    a touch panel;
    a mover arranged in the touch panel;
    the control circuit according to claim 1; and
    a DC/DC converter controlled by a pulse signal output from the control circuit; wherein
    an output voltage of the DC/DC converter is applied to the mover.

\* \* \* \* \*